(12) United States Patent
Erni

(10) Patent No.: US 9,339,904 B2
(45) Date of Patent: May 17, 2016

(54) POWER TOOL WITH A CLAMPING MECHANISM FOR CLAMPING A TOOL

(71) Applicant: Alain Erni, Bichwil (CH)

(72) Inventor: Alain Erni, Bichwil (CH)

(73) Assignee: C. & E. Fein GmbH, Schwaebisch Gmuend- (DE)

( * ) Notice: Subject to any disclaimer, the term of this patent is extended or adjusted under 35 U.S.C. 154(b) by 425 days.

(21) Appl. No.: 13/864,802

(22) Filed: Apr. 17, 2013

(65) Prior Publication Data

US 2013/0270780 A1 Oct. 17, 2013

(30) Foreign Application Priority Data

Apr. 17, 2012 (DE) .......................... 10 2012 007 927

(51) Int. Cl.
| | |
|---|---|
| B23B 31/19 | (2006.01) |
| B23Q 3/12 | (2006.01) |
| B24B 45/00 | (2006.01) |
| B27B 5/32 | (2006.01) |
| B24B 23/04 | (2006.01) |
| B24B 27/08 | (2006.01) |

(52) U.S. Cl.
CPC . *B23Q 3/12* (2013.01); *B23B 31/19* (2013.01); *B24B 23/04* (2013.01); *B24B 27/08* (2013.01); *B24B 45/006* (2013.01); *B27B 5/32* (2013.01); *Y10T 279/33* (2015.01)

(58) Field of Classification Search
CPC .... B24B 23/04; B24B 45/006; B24B 23/022; B24B 45/00; B27B 5/32; B27B 19/006; Y10T 279/33; Y10T 83/9379
USPC .......................................................... 279/141
See application file for complete search history.

(56) References Cited

U.S. PATENT DOCUMENTS

| | | | |
|---|---|---|---|
| 4,901,479 A * | 2/1990 | Helm | 451/342 |
| 5,263,283 A | 11/1993 | Rudolf et al. | |
| 8,187,058 B2 | 5/2012 | Blickle et al. | |
| 2012/0139196 A1 | 6/2012 | Zhou | |

FOREIGN PATENT DOCUMENTS

| | | |
|---|---|---|
| DE | 3742430 A1 | 6/1989 |
| DE | 4134072 A1 | 4/1993 |
| DE | 202009001439 U1 | 7/2010 |
| DE | 202011050937 U1 | 11/2011 |
| EP | 2017036 A1 | 1/2009 |
| WO | 2005102605 A1 | 3/2005 |

* cited by examiner

*Primary Examiner* — Eric A Gates
*Assistant Examiner* — Paul M Janeski
(74) *Attorney, Agent, or Firm* — St. Onge Steward Johnston & Reens, LLC

(57) ABSTRACT

The invention discloses a hand-held power tool including a housing with a spindle head. A tool spindle can be driven in rotary oscillation about its longitudinal axis and, at its tool-side end, is configured to carry a tool. The tool spindle has a clamping mechanism, which is configured to move a positioning element between a clamping position, in which a tool that is to be carried can be fixed to the tool spindle, and a release position, in which the tool can be released. The clamping mechanism has an actuating mechanism having an actuating element configured as a slide having an engaging surface for axially moving the positioning element to move the clamping mechanism between the clamping and the release positions when the actuating element is moved.

17 Claims, 4 Drawing Sheets

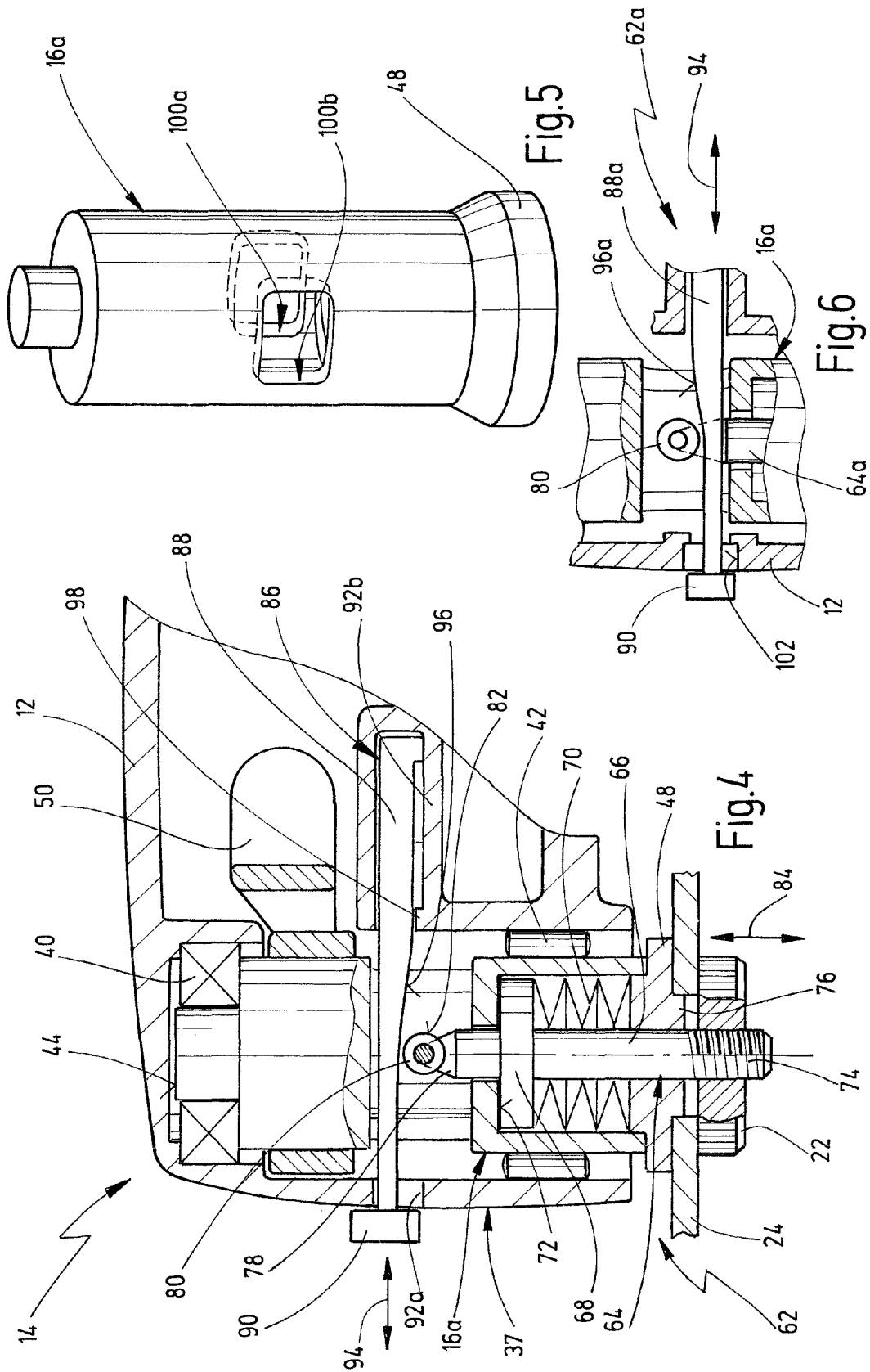

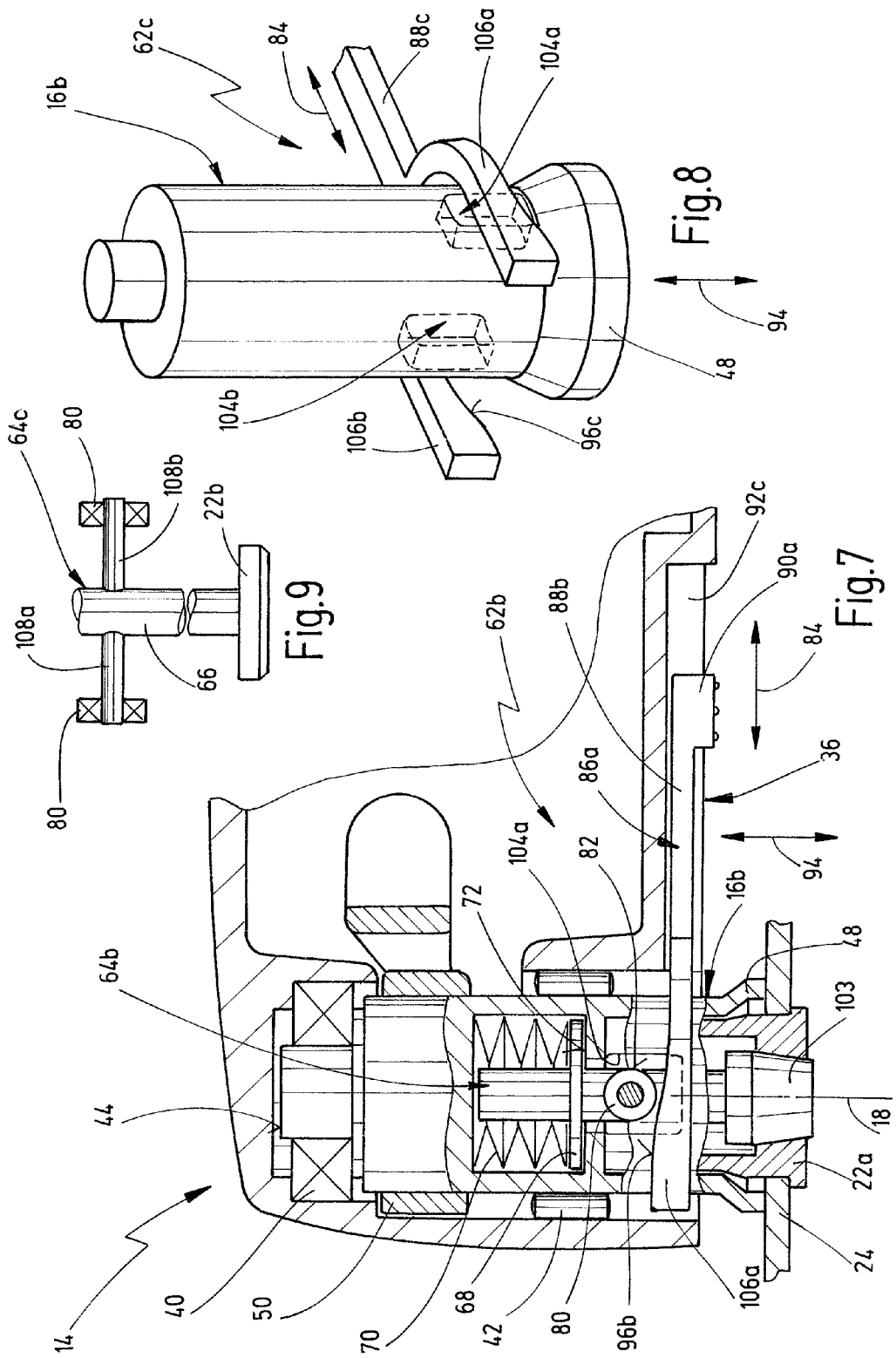

ns; and
wherein said engaging surface of said slide is configured for engaging said positioning element for moving said positioning element axially between said clamping and said release positions.
POWER TOOL WITH A CLAMPING MECHANISM FOR CLAMPING A TOOL

CROSS REFERENCES TO RELATED APPLICATIONS

This application claims priority from German patent application 10 2012 007 927.3, filed on Apr. 17, 2012. The entire content of this priority application is incorporated herein by reference.

BACKGROUND OF THE INVENTION

The invention relates to a hand-held power tool, which comprises a housing that has a spindle head, having a tool spindle that can be driven in rotary oscillation about its longitudinal axis and that, at its tool-side end, is configured to carry a tool, the tool spindle being carried in the spindle head at least by means of a drive-side bearing and a tool-side bearing, and having a clamping mechanism, which is configured to move a positioning element between a clamping position, in which a tool that is to be carried can be fixed to the tool spindle, and a release position, in which the tool can be released, the clamping mechanism having an actuating mechanism, which comprises an actuating element that can be coupled to the positioning element for the purpose of moving the latter.

Such a hand-held tool is known, for example, from WO 2005/102605 A1. The known hand-held tool has a working spindle for driving a tool, the tool being such that it can be fixed to a tool-side end of the working spindle by means of a fastening element. Also provided is a displacement device, which is configured to displace the fastening element between a release position and a clamping position. In the release position, the fastening element can be released from the working spindle. In the clamping position, the fastening element can be clamped against the working spindle by a spring element, in order to fix the tool. The displacement device is additionally coupled to a swivel lever, which has an eccentric. Through swivelling of the swivel lever, a pressure piece can be acted upon, by means of the eccentric, for the purpose of moving the pressure piece. The positioning lever is disposed in an upper region of the hand-held tool that faces away from a tool-side end of the working spindle. The swivel lever is configured to act axially upon the pressure piece, the end of which projects through the working spindle in the region of its end that faces away from the tool-side end.

The known hand-held tool can enable a tool to be changed rapidly and easily without the need for separate accessories such as, for instance, a wrench, screwdriver, hexagon key or similar, for releasing or fixing the tool. In particular, no special tools are needed to enable the tool to be fixed on the working spindle. Frequently, when a hand-held tool is being used, such separate accessories become lost or are simply left behind, for instance in a toolbox. As a result, the effort required for changing a tool can be significantly increased.

The hand-held tool known from WO 2005/102605 A1 can, in principle, overcome this disadvantage. It has been found, however, that various user groups still perceive the tool changing operation as being relatively awkward.

Further hand-held tools having swivellable actuating levers are additionally known from EP 2 017 036 A1 and DE 20 2009 001 439 U1. In the case of these hand-held tools, also, the actuating lever is in each case disposed in an upper region of the housing that faces away from the tool-side end of the working spindle.

SUMMARY OF THE INVENTION

In view of this, it is a first object of the invention to disclose a hand-held power tool that allows easy tool changing without the use of separate accessories.

It is a second object of the invention to disclose a hand-held power tool that allows an easy tool changing in a new and ergonomic way.

It is a third object of the invention to disclose a hand-held power tool that allows for a simplified design of the tool spindle.

According to one aspect of the invention, these and other objects are achieved by a hand-held power tool, comprising:
a housing having a spindle head;
a tool spindle having a longitudinal axis and being be driven rotatingly oscillatingly about its longitudinal axis, said tool spindle further having a drive-side and a tool-side;
a first bearing arranged within said spindle head on said drive-side of said tool spindle;
a second bearing arranged within said spindle head on said tool-side of said tool spindle; and
a clamping mechanism comprising a positioning element arranged within said tool spindle axially displaceably between a clamping position for clamping a tool on said tool spindle, and between a release position for releasing a tool from said tool spindle;
wherein said tool spindle is supported within said spindle head at least by means of said first and second bearings;
wherein said clamping mechanism further comprises an actuating mechanism having an actuating element being configured as a slide;
wherein said slide further comprises an engaging surface being disposed between said first and second bearings; and
wherein said engaging surface of said slide is configured for engaging said positioning element for moving said positioning element axially between said clamping and said release positions.

According to the invention, the actuating element can now be disposed in a region of the housing (of the spindle head) that is significantly closer to the tool. A user thereby has various advantages during tool changing. The tool-side end of the tool spindle and the actuating element can be located closer to each other. In particular, it is possible to avoid the need even to "turn over" the hand-held tool during tool changing. This is necessary in the case of hand-held tools known in the prior art if, for instance, the user has to actuate an actuating element on a top side of the housing and subsequently or simultaneously has to load the tool that is to be fixed on an underside that faces away from the top side.

The engaging surface of the positioning element is disposed, at least temporarily, between the drive-side bearing and the tool-side end of the tool spindle. In other words, the actuating element and the positioning element can be coupled in a coupling region whose axial extent is delimited by the drive-side bearing and by the tool-side end of the tool spindle. For example, the coupling region can be delimited by two intersecting planes, which are disposed perpendicularly in relation to the longitudinal axis. A first intersecting plane can represent the axial position of the drive-side bearing. A second intersecting plane can represent the axial position of the tool-side end of the tool spindle. A combined action of the actuating element and the positioning element in such a coupling region makes it possible to avoid the awkward arrangement of actuating elements on the top side of the housing, as in the prior art.

Usually, in the case of hand-held tools having a rotary oscillation output (oscillating tools), tool spindles have precisely two bearings. The tool-side bearing is the bearing that is disposed between the drive-side bearing and the tool-side end of the tool spindle. The drive-side bearing and the tool-side bearing are spaced apart by a structurally determined distance. A large bearing distance can be instrumental, for instance, in reducing radial loads of the drive-side bearing or of the tool-side bearing. When in operation, tool spindles that can be driven in rotary oscillation regularly execute high-frequency rotary oscillations with relatively small angles of swivel. In the case of many applications, this particular type of drive provides advantages; work can be performed with high precision and in an ergonomic manner. Frequently, however, rotary oscillation drives cause high loads on the tool spindle. For instance, there may be high-frequency torsional oscillations. In addition, upon each oscillatory stroke the tool spindle is accelerated and braked in a very short timespan. High shock-like and jolt-like loads can be produced as a result.

The influences described above can make it necessary for the tool spindle and the associated bearings to have large dimensions. It is therefore advantageous to utilize this structural space—that is present in any case—in order to couple the actuating element and the positioning element to each other.

Since the engaging surface of the positioning element is disposed between the drive-side bearing and the tool-side bearing, the design of the hand-held tool can be such that it has a compact and integrated appearance. The positioning of the engaging surface of the positioning element can result in a greater freedom in the configuration and positioning of the actuating element. The hand-held tool can be of a more compact design overall. The ergonomics of the hand-held tool can be improved, in particular for tool changing.

It is understood that it is also possible for a plurality of engaging surfaces, which can be coupled to the actuating element, to be provided on the positioning element.

According to a further design, the actuating element is configured as an actuating slide and, in particular, can act upon the positioning element for the purpose of moving the latter axially.

The axial moving of the positioning element is regularly effected along the longitudinal axis, or in parallel thereto. In the case of the positioning element, it is thereby possible to produce a positioning movement that provides for a multiplicity of differing clamping devices. For instance, the clamping devices known from WO 2005/102605 A1, EP 2 017 036 A1 or DE 20 2009 001 439 U1 can easily be modified and coupled to the actuating slide.

According to a further design, the engaging surface is disposed, at least in the clamping position or the release position, in a coupling region whose axial extent is delimited by the drive-side bearing and by the tool-side bearing of the tool spindle.

In other words, the engaging surface can be disposed between the drive-side bearing and the tool-side bearing. As already mentioned above, the coupling region can describe a (notional) space, in which the actuating element can be disposed and configured for the purpose of acting in combination with the positioning element.

According to a development of this design, the tool spindle has an eccentric fork, which is disposed between the drive-side bearing and the tool-side bearing, the axial extent of the coupling region being delimited by the eccentric fork and the tool-side end of the tool spindle, preferably by the eccentric fork and the tool-side bearing of the tool spindle.

In other words, the engaging surface, or the actuating element, can be disposed between the eccentric fork and the tool-side end, preferably between the eccentric fork and the tool-side bearing of the tool spindle.

Optimum use can thereby be made of an existing structural space. Both the eccentric fork and the coupling region can be disposed between the drive-side bearing and the tool-side bearing. The tool spindle need not project significantly beyond the drive-side bearing or the tool-side bearing in order to provide structural space for these components.

In an alternative design, the engaging surface is disposed, at least in the clamping position or the release position, in a coupling region whose axial extent is delimited by the tool-side bearing and by the tool-side end of the tool spindle.

The engaging surface can thereby be disposed in a region of the tool spindle that lies outside of the distance between the drive-side bearing and the tool-side bearing. The engaging surface can come particularly close to the tool-side end of the tool spindle. Accordingly, the actuating element can also be disposed close to the tool-side end of the tool spindle. This feature enables tool changing to be simplified further, since, for instance, the tool receiver and the actuating element are easily and rapidly accessible by a user.

According to a further design, the actuating element is disposed on an underside of the housing that faces towards a carried tool.

The underside of the housing is that part of the housing that faces towards a viewer when the housing assumes an orientation, in respect of the viewer, in which the longitudinal axis is approximately parallel to the direction of viewing and the tool-side end of the tool spindle faces towards the viewer. The side of the housing that faces away from the viewer in the case of this orientation can be referred to as a top side.

Since the actuating element is disposed on the underside of the housing, the design of the exterior of the hand-held tool can be such that it has a more closed and integrated appearance. In particular, the top side of the housing can be kept free of mount-on parts in the region of the spindle head. In addition, tool changing can be performed in a yet more ergonomic manner. For example, the user can hold the housing of the hand-held tool "on the back", such that he can directly access the tool receiver of the tool spindle and the actuating element.

It is understood that the underside, or the top side, of the housing can be fixedly assigned to the regions of the housing described above. This means that, even if the hand-held tool is turned over, the underside is constituted by the part that is also represented by the underside when in an initial orientation. Thus, in the case of a hand-held tool that has been turned over, the underside can also be located at the "top", depending on the orientation.

In a preferred development, the actuating element is carried in a sinkable manner on the spindle head, and preferably can be moved substantially radially in the direction of the longitudinal axis, relative to the spindle head.

In particular, if the actuating element is configured as an actuating slide, the latter can be slid, either in the clamping position or in the release position, into the spindle head or into the housing. For example, the actuating element can have a pull tab or pressure tab, by means of which the user can grip and move the actuating element.

Preferably, the actuating element is carried on the spindle head or on the housing such that it is sunk-in when in the clamping position. Accumulation of dirt on the actuating element when the hand-held tool is in operation can thereby be minimized or prevented entirely. Rather, the actuating element appears only when tool changing is necessary. This measure, likewise, can offer design advantages.

According to a further design, the actuating element can be displaced along a path configured substantially perpendicularly in relation to the longitudinal axis.

This means that it is not absolutely necessary for the path to run radially in the direction of the longitudinal axis. Rather, the path can be such that, when being displaced, the actuating element is spaced apart radially from the longitudinal axis.

In an advantageous development, the actuating element has an inclined coupling surface, which causes the positioning element to be moved axially as the actuating element is moved.

The inclined coupling surface can be configured to act in combination with the engaging surface of the positioning element. The inclined coupling surface can have an upwardly or downwardly inclined flank. By means of the inclined coupling surface, an actuating force, or an actuating path, can be transformed into a positioning force, or a positioning path, in the case of the positioning element.

According to a development of this design, the coupling surface is configured, at least portionally, as a wedge surface.

Thus, advantageously, a transformation of force can be effected. For example, a small actuating force applied in the case of a long actuating path can be changed into a large positioning force, which results in a short positioning path.

It is understood that the coupling surface, in addition to comprising the at least portionally configured wedge surface, can further also comprise transitions, latching surfaces and similar shape elements. Transitions can be instrumental, for instance, in simplifying the actuation, in that initially a very small inclination is provided, which is adjoined by portions having a more pronounced inclination. Latching surfaces can be configured, for instance, as protrusions or hollows along the coupling surface. For the user, the latching surfaces provide a defined feedback. The feedback can, for example, indicate an actual position of the actuating element, or of the positioning element, thus, for instance, the clamping position or the release position.

In an advantageous development, the clamping device has a spring element, which acts upon the positioning element in the direction of the clamping position.

The actuating element can thereby be configured, for instance, to act upon the positioning element, against the force of the spring element, during the transition from the clamping position to the release position. The transition from the release position to the clamping position can be effected easily, with the spring element acting in combination.

It is conceivable for the inclined coupling surface of the actuating element to be configured in such a way that self-locking ensues in the release position. In the case of this design, the actuating element, or the positioning element, cannot be brought automatically from the release position and into the clamping position by the spring element. Conversely, it is conceivable for the coupling surface of the actuating element to be configured in such a way that an automatic reset is enabled, i.e. the actuating element, or the positioning element, is brought automatically from the release position and into the clamping position by means of the spring element.

According to a further aspect, the positioning element has at least one guide roller, via which the actuating element can act upon the positioning element, for the purpose of moving the latter.

The positioning element and the actuating element can thereby be coupled to each other. The at least one guide roller can be provided with the engaging surface, for example on its circumference. The at least one guide roller can act in combination with the inclined coupling surface of the actuating element. The at least one guide roller can be carried as a bearing, for instance as a ball bearing, rolling bearing or plain bearing, indirectly or directly on the positioning element. For example, the at least one guide roller can be mounted on an axle that is oriented substantially perpendicularly in relation to the longitudinal axis.

According to an advantageous design, the actuating element extends through a recess of the tool spindle.

For example, the tool spindle can be such that the actuating element can extend radially through it. This can be configured, for instance, by means of at least one recess that, from the point of view of the actuating element, provides a clearance in which the actuating element can go through the tool spindle. In the case of this design, the positioning element is preferably carried in the tool spindle, the engaging surface being disposed in such a way that the actuating element, which goes through the tool spindle, can contact the engaging surface in the tool spindle.

When the hand-held tool is in operation, the tool spindle oscillates at high frequency about a small angle of swivel. It is therefore preferred if the at least one recess of the tool spindle is adapted to the actuating element in such a way that, during operation, no contact occurs between the actuating element and the tool spindle when the actuating element is in the clamping position.

The at least one recess on the actuating element can likewise be disposed, for instance, between the drive-side bearing and the tool-side end, preferably between the drive-side bearing and the tool-side bearing of the tool spindle. Alternatively, the at least one recess of the tool spindle between the tool-side bearing and the tool-side end of the tool spindle can be configured in the latter.

According to a further design, the actuating element has at least one contact arm that, at least in the clamping position or in the release position, is disposed at the side of an outer circumference of the tool spindle, spaced apart from the latter, the actuating element preferably being configured as a contact fork having two contact arms.

As a result, the actuating element need not be moved through the tool spindle. Rather, the actuating element can be guided laterally past the outer circumference of the tool spindle. Each of the contact arms can have a coupling surface, for coupling to a corresponding engaging surface of the positioning element. For example, the positioning element can have at least one guide arm, which extends, for instance, substantially radially outwards from the longitudinal axis and which is configured to be contacted by the contact arm of the actuating element. A guide roller can be carried on at least one guide arm. In other words, the at least one guide arm can project laterally through the tool spindle.

In an advantageous development, the actuating element, when in the clamping position, is decoupled from the positioning element.

The positioning element can thereby be carried on the tool spindle, or coupled to the latter, in such a way that rotary driving, or oscillatory driving, is effected. For example, the positioning element can be carried in the tool spindle such that it is longitudinally displaceable but secured against relative rotations. If, when the hand-held tool is in operation, the positioning element oscillates together with the tool spindle, the decoupling from the actuating element allows operation to be effected with a low rate of wear. The decoupling in the clamping position can be configured, for example, by a relief or hollow on the coupling surface of the actuating element. The positioning element can, in principle, be held securely by the spring element, such that, in the clamping position, there is no need for a direct coupling to the actuating element.

It is understood that the features mentioned above and those to be explained in the following can be applied, not only in the respectively specified combination, but also in other combinations or singly, without departure from the scope of the present invention.

BRIEF DESCRIPTION OF THE DRAWINGS

Further features and advantages of the invention are given by the following description of a plurality of preferred exemplary embodiments, with reference to the drawings, wherein:

FIG. 4 shows a longitudinal section through a hand-held tool, for instance according to FIG. 1, in the region of its spindle head, the hand-held tool having a clamping device;

FIG. 5 shows a perspective view of a tool spindle that, in principle, can be applied in the case of the hand-held tool according to FIG. 4;

FIG. 6 shows a highly simplified partial view of a clamping device, turned away as compared with the clamping device according to FIG. 4, in the region of an actuating element;

FIG. 7 shows a longitudinal section through a further hand-held tool, having a clamping tool turned away as compared with the representation according to FIG. 4;

FIG. 8 shows a perspective view of a tool spindle and of an alternative actuating element, which can be used, for instance, in the case of the clamping device according to FIG. 7; and FIG. 9 shows a simplified, broken partial representation of an alternative positioning element that can be applied in the case of the clamping device according to FIG. 7.

DETAILED DESCRIPTION OF PREFERRED EMBODIMENTS

Figure 1:
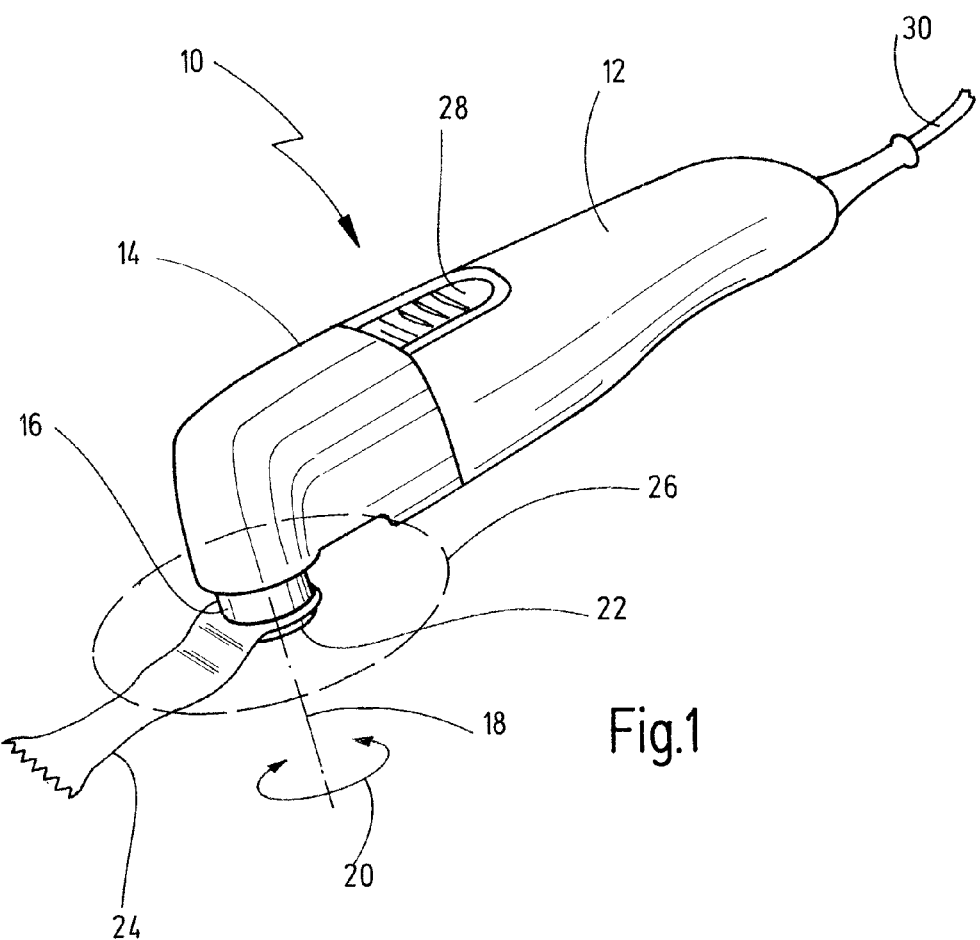
FIG. 1 shows a perspective view of a hand-held tool.

Represented in FIG. 1 is a hand-held tool that is denoted as a whole by 10. The hand-held tool 10 is a powered hand-held tool, in particular a hand-held tool driven by an electric motor. The hand-held tool 10 is designed as an oscillatory drive. A hand-held tool having a rotary oscillating drive can be used for a multiplicity of sawing tasks, cutting tasks, filling tasks, abrading tasks or similar. Usually, such hand-held tools (oscillating tools) have swivel frequencies in the range from approximately 10 000 to 25 000 oscillations per minute. The oscillations can be effected, for instance, with a small angle of swivel, which is, for example, between 0.5° and 7°.

The hand-held tool 10 has a housing 12, adjoining which there is a spindle head 14. It is understood that the spindle head 14 can be an integral constituent part of the housing 12. It is likewise conceivable for the spindle head 14 to be flange-connected, in the manner of a module, to the housing 12. A force transmission device, in particular an eccentric coupling drive (not represented in FIG. 1), can be carried in the housing 12 (and in the spindle head 14). The housing 12 can accommodate a motor, for example an electric motor or a compressed-air motor. In addition, energy storage devices can be carried in the housing 12. This can be the case, for instance, if the hand-held tool 10 is a hand-held tool 10 that can be operated independently of a mains power supply, in particular a hand-held tool 10 having a rechargeable battery pack.

Mounted in the spindle head 14 is a tool spindle whose tool-side end projects through the housing 12 outwardly in the region of the spindle head 14. The tool spindle 16 can execute an output drive motion, in particular a rotary oscillation. The oscillatory output drive motion produced in the case of the preferred design of the hand-held tool 10 as an oscillating tool is indicated by an double arrow, which is denoted by 20.

A tool 24 is carried on the tool spindle 16 and secured by means of a fastening element 22. The tool 24 is, for example, a sawing tool or a cutting tool, which has a toothing having a spatially limited extent. As already explained above, the tool 24 can also be configured, however, as an abrasive tool, a polishing tool or similar. The tool 24 can have an offset.

A circle line denoted by 26 indicates that it is also possible to use tools that are substantially rotationally symmetrical, for example abrasive discs, circular saw blades or similar. The housing 12 can be configured approximately in the form of a rod, and have an operating switch 28 in an upper region that faces away from the tool 24. A user can thus hold and guide the hand-held tool 10 in a rear region, and start or stop the hand-held tool 10 by means of the operating switch 28. At a rear end, which faces away from the spindle head 14, the hand-held tool 10 additionally has a power supply line 30, which is represented merely partially in FIG. 1. By means of the power supply line 30, the hand-held tool 10 can be coupled, for instance, to a power supply network, for example to an electric power network or to a compressed-air supply network. As already mentioned above, however, the hand-held tool 10 can also be operated independently of a power supply network, for example through use of a rechargeable battery pack.

Hand-held tools having a rotary oscillating output drive can generally be used in a highly flexible manner. However, this high degree of flexibility can have the consequence that the tool 24 has to be changed comparatively frequently. It is advantageous, in the case of the tool 10, to provide a clamping device that, in principle, can be designed in a manner approximately similar to the clamping devices of WO 2005/102605 A1, EP 2 017 036 A1 and DE 20 2009 001 439 U1. The known clamping devices all have actuating levers, which are disposed in an upper region of the housing of the hand-held tool that faces away from the carried tool. In the following, various designs of the hand-held tool 10 are explained, in which actuating devices are designed in a particular manner to enable tool changing to be simplified, and to enable the exterior design of the hand-held tool 10 to be optimized while retaining the functional scope.

Figure 2:
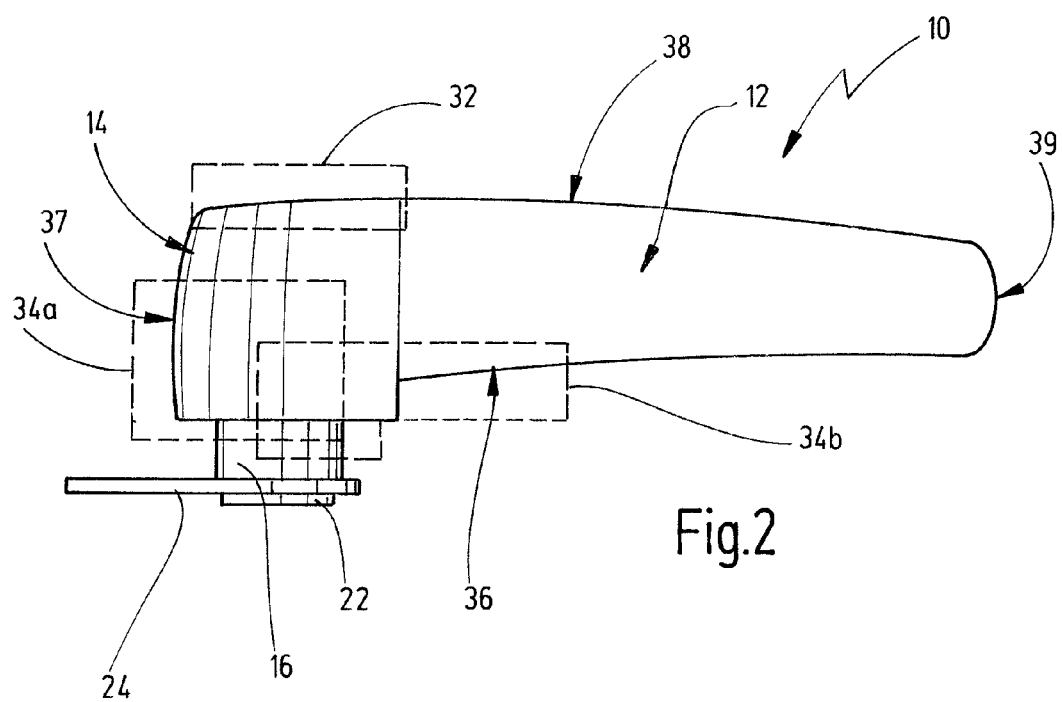
FIG. 2 shows a highly simplified, schematic side view of a hand-held tool, for instance according to FIG. 1.

FIG. 2 shows a schematic side view of a hand-held tool 10, which can correspond, for instance, to the hand-held tool 10 according to FIG. 1. It is understood that, for illustrative reasons, the representations in FIGS. 1 to 9 may not be true to scale or in correct proportion. The references 32, 34a and 34b denote various actuating regions in which actuating elements, for actuating a clamping device for fixing or releasing the tool 24, may be attached. The reference 32 denotes an upper actuating region that is used, for instance in the case of hand-held tools known in the prior art, for carrying an actuating element, in particular an actuating lever. The upper actuating region 32 is disposed on a side of the spindle head 14 (or of the housing 12) of the hand-held tool 10 that faces away from the tool 24. Consequently, for the purpose of tool changing, the user has to both load the tool 24 onto the tool spindle 16, or release it from the latter, and operate the actuating lever in the actuating region 32 on the opposite side of the spindle head 14.

The references 34a and 34b denote two alternative actuating regions, which can partially overlap each other. In comparison with the upper actuating region 32, the actuating regions 34a and 34b have been brought closer to the tool 24. It can be advantageous for actuating elements to be disposed in the actuating region 34a or in the actuating region 34b. For the operator, tool changing can be simplified significantly as a result.

In addition, in FIG. 2, the references 36, 37, 38 and 39 denote differing sides of the hand-held tool 10, or of its housing 12, which can correspond, for instance, to standard viewing orientations. The reference 36 denotes an underside of the housing 12. The underside 36 is the side of the housing 12 on which the tool spindle 16 projects out of the housing 12 (or out of the spindle head 14) in order to carry the tool 24. The reference 38 denotes a top side, which identifies the side of the housing 12 that is opposite the underside 36. The top side 38 faces away from the tool 24. A front side of the housing 12 is denoted by 37. The front side 37 identifies the side of the housing 12 on which the spindle head 14 is realized. Opposite the front side 37 and facing away from the spindle head 14, there is a rear side, which is denoted by 39. The actuating region 34a is disposed in the region of the spindle head 14, on the front side 37 and on the underside 36. The actuating region 34b is disposed predominantly in the region of the underside 36, and can likewise also project, at least partially, into the region of the front side 37.

The actuating regions 34a and 34b, in which actuating elements can advantageously be disposed, can engage, at least partially, in a region in which the tool spindle 16 is disposed in the spindle head 14.

Figure 3:
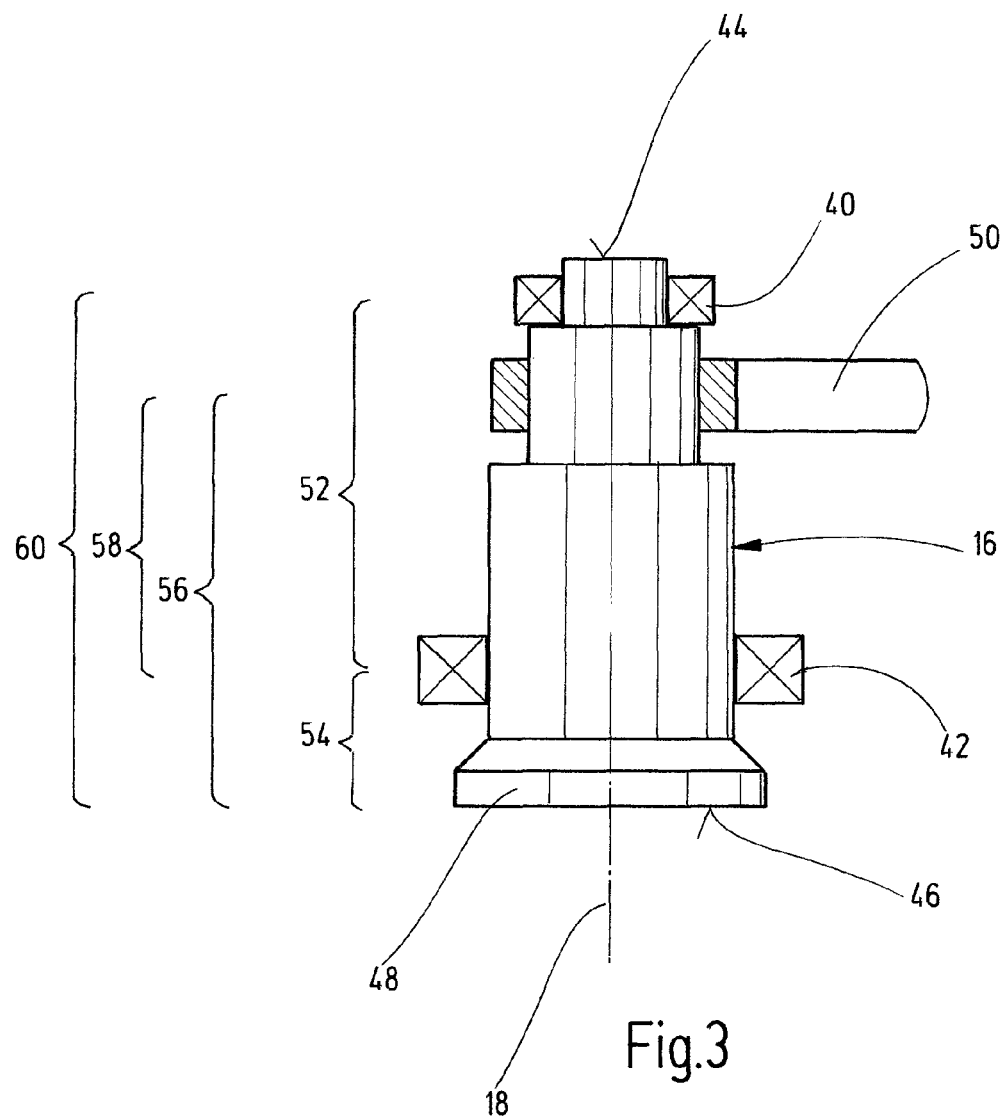
FIG. 3 shows a simplified, schematic lateral representation of a tool spindle, to illustrate geometric relationships.

An exemplary basic configuration of a tool spindle 16, from which the spindle head 14, or the housing 12, has been omitted, is represented in FIG. 3. The tool spindle 16 can be carried, for instance, in the spindle head 14 according to FIG. 2, by means of a drive-side bearing 40 and a tool-side bearing 42, cf. also FIG. 4 and FIG. 7. In proximity to the drive-side bearing 40, the tool spindle 16 has a drive-side end 44. In proximity to the tool-side bearing 42, the tool spindle 16 has a tool-side end 46. A retaining portion 48, on which the tool 24 can be carried, can be realized at the tool-side end 46. Between the drive-side bearing 40 and the tool-side bearing 42, an eccentric fork 50 is coupled to the tool spindle 16 in a rotationally fixed manner. The eccentric fork 50 can be configured, for instance, to transform a drive motion of a drive motor (not represented in FIG. 3) into a rotary oscillating output drive motion of the tool spindle 16, cf. the arrow 20 in FIG. 1. The eccentric fork 50 can be designed, for instance, to be coupled to an eccentrically revolving portion of a motor shaft that acts upon the eccentric fork 50, for example via a domed bearing.

Actuating devices known in the prior art that have actuating elements usually act, via the drive-side end 44, upon a positioning element (not represented in FIG. 3) that is carried on or in the tool spindle 16. The drive-side end 44 is remote from the tool-side end 46.

It would therefore be advantageous for an actuating element to be disposed in a region located closer to the tool-side end 46, for the purpose of acting in combination there with, for instance, a positioning element.

Such a coupling region can extend axially (along the longitudinal axis 18), for instance, between the drive-side bearing 40 and the tool-side end 46. An associated axial distance is denoted by 60 in FIG. 3. In principle, the coupling region can also be realized between the drive-side bearing 40 and the tool-side bearing 42, cf. a bearing distance denoted by 52. Alternatively, the coupling region can also extend between the tool-side bearing 42 and the tool-side end 46, cf. a distance dimension denoted by 54. According to a further alternative, the coupling region can extend between the eccentric fork 50 and the tool-side end 46; an associated distance dimension is denoted by 56. Finally, the coupling region can also extend, alternatively, between the eccentric fork 50 and the tool-side bearing 42, cf. a distance denoted by 58.

The tool spindle 16 can be designed and adapted in a particular manner, such that an actuating element, in one of the coupling regions, can act in combination with a positioning element carried in the tool spindle 16, for the purpose of moving the positioning element. A first such design is described in the following with reference to FIG. 4.

FIG. 4 shows a hand-held tool 10, for instance according to FIG. 1 or 2, represented in section in the region of the spindle head 14. In a manner similar to the disposition of the tool spindle 16 described in connection with FIG. 3, in FIG. 4 a tool spindle 16a is provided, which, by means of the drive-side bearing 40 and the tool-side bearing 42, is carried in the housing 12, or in the spindle head 14. Additionally provided, on the spindle head 14, there is a clamping device 62, by means of which the tool 24 can be fixed to the tool spindle 16a or released from the latter.

The clamping device 62 has a positioning element 64, which is carried on the tool spindle 16a. In particular, the positioning element 64 is carried predominantly inside the tool spindle 16a. For this purpose, the tool spindle 16a is provided, at least partially, with recesses or cavities. The positioning element 64 has a shank 66, which can extend, for instance, along the longitudinal axis 18 (cf. FIG. 3). Provided on the shank 66 there is a pressure piece 68, which can be configured, for instance, as a collar. The clamping device 62 additionally has a spring element 70, which is carried on the tool spindle 16a and acts upon the pressure piece 68, and consequently on the positioning element 64, in the direction of a spindle stop 72.

The spring element 70 can act upon the positioning element 64 in the direction of a clamping position, in which the tool 24 can be securely fixed, by means of the fastening element 22, to the retaining portion 48 of the tool spindle 16a. The spring element 70 can be configured, for instance, as a helical spring, disc spring, or helical spring assembly. The spring element 70 can be configured as a compression spring, but alternatively can also likewise be configured as a tensile spring. It is likewise conceivable for the spring element 70 to be configured as a fluidic spring, for example as a gas compression spring. In the clamping position, it is not necessary for the pressure piece 68 to contact the spindle stop 72.

The fastening element 22 according to FIG. 4 is configured, for example, as a nut or as a knurled nut. Configured on the shank 66 of the positioning element 64 there is a thread 74, which corresponds to a corresponding mating thread of the fastening element 22. In the clamping position shown in FIG. 4, the tool 24 can be clamped against the retaining portion 48 by means of the fastening element 22, which is biased by means of the positioning element 64. In addition, a projection 76 can be configured on the retaining portion 48. The projection 76 can provide, for example, centering for the tool 24. For this purpose, the projection 76 can be configured, for instance, in the form of a circle or annulus. In addition, however, the projection 76 can also provide a means of securing the tool 24 against rotation. For this purpose, the projection 76 can be configured, for example, in the form of a polygon, in the form of a star, in the form of a splined shaft, or in similar manner, having form-closure elements. A corresponding mating contour on the tool 24 can be combined with the projection 76 shaped thus, in order to secure the carried tool 24 against a relative rotation in respect of the tool spindle 16a.

The positioning element 64 can be moved, by means of an actuating device 86, in the direction of a release position. In the release position, the fastening element 22 is relieved of load, such that the fastening element 22 can be easily released or separated from the positioning element 64. The tool 24 can then be released. For the purpose of coupling to the actuating device 86, in the case of the positioning element 64 a bearing piece 78 is provided, on which, for instance, a guide roller 80 is carried. The bearing piece 78 is provided at an end of the positioning element 64 that faces towards the drive-side end 44 of the tool spindle 16a. A engaging surface 82 is configured on the circumference of the guide roller 80.

The guide roller 80 can be configured, for instance, as a bearing, in particular as a ball bearing, needle bearing or plain bearing. If the engaging surface 82 is configured on the circumference of the guide roller 80, frictional forces that occur during the actuating or moving of the positioning element 64 can be reduced significantly. Actuating forces can likewise be reduced. It is also easily conceivable for the engaging surface 82 to be provided, for instance, in a fixed manner on an outside end of the positioning element 64. A engaging surface 82 configured in such a manner can also be contacted in a sliding manner, for the purpose of moving the positioning element 64. The positioning element 64 can be moved, in particular axially, by the actuating device 86, cf. an arrow denoted by 84.

The actuating device 86 has an actuating element 88 that, in the present case, is configured, for instance, as an actuating slide. The actuating element 88 has an actuating handle 90, which can be gripped by a user for the purpose of moving the actuating element 88. The actuating element 88 is carried in a displaceable manner on receivers 92a, 92b in the spindle head 14, or in the housing 12. The user can move the actuating element 88 along a guide path, cf. an arrow denoted by 94. Such a sliding movement can be effected, for instance, perpendicularly in relation to the longitudinal axis 18. In other words, the actuating element 88 can be moved, for example, out of the spindle head 14, for the purpose of moving the positioning element 64 out of the clamping position and into the release position. Pushing in, or sinking, the actuating element 88 in the spindle head 14 can, in turn, bring the positioning element 64 from the release position and into the clamping position. The actuating element 88 has a coupling surface 96, which is inclined in such a way that the positioning element 64 can be moved axially as the actuating element 88 is being displaced.

In addition, at least one travel stop 98, which prevents excessive travel of the positioning element 88, can be provided on the housing 12 of the hand-held tool 10. The actuating element 88 can thereby be held in a captive manner in the housing 12 of the hand-held tool 10.

The tool spindle 16a according to FIG. 5 is of a design that is basically comparable to that of the tool spindle 16a according to FIG. 4. It can be seen from FIG. 4 and FIG. 5 together that the actuating element 88 is carried on the spindle head 14 in such a way that it can project through the tool spindle 16a. Provided in the tool spindle 16a are spindle recesses 100a, 100b, which define openings through which the actuating element 88 can extend. The spindle recesses 100a, 100b are of sufficiently large dimensions to prevent contacting of the actuating element 88 by the oscillating tool spindle 16a when the hand-held tool 10 is in operation. A structural space that is available on the tool spindle 16a in any case can be used to dispose the actuating device 86 in an advantageous position on the housing 12 of the hand-held tool 10. Such a design, for instance in the case of given dimensions of the spindle head 14, or of the housing 12, allows the drive-side bearing 40 and the tool-side bearing 42 to be moved apart. As a result, for instance, in particular, radial loads on the bearings 40, 42 can be reduced.

It can additionally be seen from FIG. 4 that, in the clamping position, there need not be any direct contact between the engaging surface 82 and the coupling surface 96. The coupling surface 96 can act upon the engaging surface 82, for instance, when the actuating element 88 has been displaced sufficiently far out of its clamping position, in the direction of the release position.

FIG. 6 shows a partial view of a clamping device 62a, which has been modified slightly in comparison with the clamping device 62 according to FIG. 4. The merely partially represented tool spindle 16a, which is represented partially in section, can in principle correspond to the tool spindle 16a according to FIG. 5. Unlike the actuating element 88 according to FIG. 4, the actuating element 88a in FIG. 6 has a coupling surface 96a that faces towards the drive-side end 44 of the tool spindle 16a. This disposition can be used to axially move the positioning element 64a in the release position, relative to its position in the clamping position, in the direction of the drive-side end 44 of the tool spindle 16a. The clamping device 62a can thereby be brought into a release configuration, in which a tool 24 can be released from the tool spindle 16a. As an adaptation to the configuration of the coupling surface 96a according to FIG. 6, the guide roller 80, which is carried on the positioning element 64a, is disposed on the side of the actuating element 88a on which the coupling surface 96a is configured.

Additionally provided in the housing 12 according to FIG. 6 there is, for example, a housing recess 102, in which the actuating handle 90 of the positioning element 88a can be sunk. If the positioning element 88a is latched-in in a virtually flush manner when in the clamping configuration, there can be resultant design advantages.

FIG. 7 shows a further section through a spindle head 14 of a hand-held tool 10, which has a clamping device 62b that has been modified as compared with the clamping device 62 according to FIG. 4. The clamping device 62b has a positioning element 64b, which can have, for instance, an integrated positioning cone 103. The positioning cone 103 is configured, for example, to contact and widen, in the clamping position, an actuating element 22a configured as a clamping jaw, to enable the tool 24 to be securely fixed to a tool spindle 116b. In the release position, the positioning element 64b can be moved in the direction of the drive-side end 44, such that the positioning cone 103 is released from the fastening element 22a. In this position, the fastening element 22a is pressed in. The tool 24 can be released. The fastening element 22 can be carried in a captive manner on the tool spindle 16b.

The clamping device 62b is coupled to an actuating device 86a, to which an actuating element 88b is assigned. The actuating element 88b is carried on a receiver 92c on the underside 36 of the housing 12. In this way, an actuating handle 90a of the actuating element 88b can be disposed particularly close to the tool 24, or its retaining portion 48, on the tool spindle 16b. This can simplify the tool changing operation significantly. The actuating element 88b has a coupling surface 96b, which faces towards the drive-side end 44 of the tool spindle 16b. The positioning element 64b can be made to move axially, cf. the arrow 94, by means of the coupling surface 96b, as a result of displacement of the actuating element 88b, cf. the arrow 84. For this purpose, the coupling surface can 96b can act upon the engaging surface 82, which can be configured, for instance, on the guide roller 80.

The coupling surface 82 of the positioning element 64 according to FIG. 4 is disposed between the drive-side bearing 40 and the tool-side bearing 42 of the tool spindle 16a, or, more precisely, between the eccentric fork 50 and the tool-side bearing 42. The engaging surface 82 of the positioning element 64*b* according to FIG. 7 is disposed between the tool-side bearing 42 and the tool-side end 46 of the tool spindle 16*b*. The disposition of the components mentioned can be effected, in principle, in each of the coupling regions illustrated, for instance, in FIG. 3.

The perspective representation of the tool spindle 16*b* shown in FIG. 8 can be used to explain the representation in FIG. 7. The tool spindle 16*b* has lateral spindle recesses 104, which are represented partially by broken lines in FIG. 7. In addition, the reference 88*c* denotes an actuating element, which, in principle, can be of a design similar to that of the actuating element 88*b* according to FIG. 7. By way of modification as compared with the actuating element 88*b*, however, the actuating element 88*c* has coupling surfaces 96*c*, which face toward the tool-side end 46 of the tool spindle 16*b*. The actuating element 88*c* is configured as a fork-shaped actuating element 88*c*, and has two contact arms 106*a*, 106*b*. The contact arm 106*a* is assigned to the lateral spindle recess 104*a*. The contact arm 106*b* is assigned to the lateral spindle recess 104*b*. The contact arms 106*a*, 106*b* can laterally encompass the tool spindle 16*b* in the region of the lateral spindle recesses 104*a*, 104*b*. However, it is not necessary for the contact arms 106*a*, 106*b* to contact the tool spindle 16*b*. The actuating element 88*c* can also be displaced, cf. the arrow 84, for the purpose of axially moving a positioning element 64, not represented in greater detail in FIG. 8, cf. the arrow 94.

FIG. 9 shows a broken partial representation of a further positioning element 64*c*, which, in principle, can be of a design similar to that of the positioning element 64*b* according to FIG. 7, in an orientation rotated by approximately 90° about the longitudinal axis 18, as compared with the representation in FIG. 7. Disposed on the positioning element 64*c* there are lateral (or radial) guide arms 108*a*, 108*b*. The latter can extend, for instance, radially outwards, going out from the shank 66. The guide arms 108*a*, 108*b* can project outwardly through the spindle recesses 104*a*, 104*b*. Accordingly, the guide rollers 80 that are carried on the guide arms 108*a*, 108*b* can be disposed outside of the tool spindle 16*b*, and contacted there by the contact arms 106*a*, 106*b* of the actuating elements 88*b*, 88*c* according to FIG. 7 or FIG. 8. Consequently, it is not the actuating element 88*c*, for example, that projects through the tool spindle 16*b*, but, rather, the positioning element 64*b*, or its guide arms 108*a*, 108*b*.

In addition, configured on the positioning element 64*c* according to FIG. 9, for example, there is a fastening element 22*b*, which, in particular, can be integrated into the positioning element 64*c*. This means that the fastening element 22*b*, when in the release position, cannot be released from the tool spindle 16*b*. By means of the fastening element 22*b*, tools 24 having open carrying contours, for instance, can be fixed to the tool spindle 16*b*. Such a carrying contour can be configured, for instance, in the form of a sleeve. Likewise conceivable is a basically closed carrying contour or carrying opening, which, however, has a lateral relief. Such a relief can be adapted, for instance, to a diameter of the shank 66 of the positioning element 64*c*, to enable the tool 24 to be loaded radially.

It is understood that the designs of the tool spindles 16 and actuating devices 86 described above can be combined with a multiplicity of clamping devices 62. In particular, known clamping devices 62 can be modified in such a way that actuating devices 86 having actuating elements 88 configured, in particular, as actuating slides can be disposed at the advantageous regions, or positions, relative to the tool spindle 16, that have been described above.

Further clamping devices 62 can have, for instance, fastening elements 22, which can act non-positively or positively upon a tool 24 that is to be carried, for the purpose of fixing it. According to an alternative design, there is provided a clamping device 62 having a fastening element 22 that has a profile adapted to a carrying profile of a tool 24 in such a way that the tool 24, in the release position, can be loaded on to the tool spindle 16 or released therefrom by means of the fastening element 22. In a clamping position, the fastening element 22 can be turned, for example, in relation to the tool 24 in such a way that the profile of the fastening element 22 at least partially overlaps the carrying profile of the tool 24. Further clamping devices 62 are conceivable, which can be switched over between a release configuration and a clamping configuration by means of a positioning movement of a positioning element 64 that can be effected by an actuating device 86.

What is claimed is:

1. A hand-held power tool, comprising:
   a housing having a spindle head;
   a tool spindle having a longitudinal axis and being be driven rotatingly oscillatingly about its longitudinal axis, said tool spindle further having a drive-side and a tool-side;
   a tool receptacle arranged on said tool-side of said tool spindle for receiving a tool;
   a first bearing arranged within said spindle head on said drive-side of said tool spindle;
   a second bearing arranged within said spindle head on said tool-side of said tool spindle; and
   a clamping mechanism comprising a positioning element arranged within said tool spindle axially displaceably between a clamping position for clamping a tool on said tool receptacle, and between a release position for releasing a tool from said tool receptacle;
   wherein said tool spindle is supported within said spindle head at least by means of said first and second bearings;
   wherein said clamping mechanism further comprises an actuating mechanism having an actuating element being configured as a slide, said slide extending substantially perpendicularly to said longitudinal axis;
   wherein said slide further comprises a engaging surface being disposed between said first and second bearings;
   wherein said engaging surface is configured as an inclined surface, which engages said positioning element for moving said positioning element axially between said clamping and said release positions when said actuating element is moved; and
   wherein said positioning element further comprises at least one guide roller for engaging said engaging surface of said actuating element.

2. The power tool of claim 1, wherein said tool spindle further comprises a recess through which said actuating element extends.

3. A hand-held power tool, comprising:
   a housing having a spindle head;
   a tool spindle having a longitudinal axis and being be driven rotatingly oscillatingly about its longitudinal axis, said tool spindle further having a drive-side and a tool-side;
   a first bearing arranged within said spindle head on said drive-side of said tool spindle;
   a second bearing arranged within said spindle head on said tool-side of said tool spindle; and
   a clamping mechanism comprising a positioning element arranged within said tool spindle axially displaceably between a clamping position for clamping a tool on said tool spindle, and between a release position for releasing a tool from said tool spindle;

wherein said tool spindle is supported within said spindle head at least by means of said first and second bearings;

wherein said clamping mechanism further comprises an actuating mechanism having an actuating element being configured as a slide;

wherein said slide further comprises an engaging surface being disposed between said first and second bearings;

wherein said engaging surface of said slide is configured for engaging said positioning element for moving said positioning element axially between said clamping and said release positions;

wherein said engaging surface of said slide comprises an engaging region configured for engaging said positioning element, said engaging region having an axial extent being delimited by said first and second bearings; and wherein said tool spindle further comprises an eccentric fork which is disposed between said first and second bearings, and wherein said axial extent of said engaging region is delimited by said eccentric fork and a tool-side end of said tool spindle.

4. The power tool of claim 3, wherein said engaging surface is disposed, at least when being in one of said clamping and release positions, in said engaging region whose axial extent is delimited by said second bearing and by a tool-side end of said tool spindle.

5. The power tool of claim 3, wherein said actuating element extends substantially perpendicularly to said longitudinal axis.

6. The power tool of claim 3, wherein said actuating element can be displaced along a path arranged substantially perpendicularly to said longitudinal axis.

7. The power tool of claim 3, wherein said actuating element has an inclined engaging surface which cooperates with said positioning element for moving said positioning element axially when said actuating element is moved.

8. The power tool of claim 7, wherein said engaging surface comprises a wedged surface.

9. The power tool of claim 3, wherein said clamping mechanism further comprises a spring element for biasing said positioning element for clamping said tool on said tool spindle.

10. The power tool of claim 3, wherein said tool spindle further comprises a recess through which said actuating element extends.

11. The power tool of claim 3, wherein said actuating element further comprises at least one contact arm that partially surrounds an outer circumference of said tool spindle, spaced apart from said tool spindle.

12. A hand-held power tool, comprising:
a housing having a spindle head;
a tool spindle having a longitudinal axis and being be driven rotatingly oscillatingly about its longitudinal axis, said tool spindle further having a drive-side and a tool-side;
a first bearing arranged within said spindle head on said drive-side of said tool spindle;
a second bearing arranged within said spindle head on said tool-side of said tool spindle; and
a clamping mechanism comprising a positioning element arranged within said tool spindle axially displaceably between a clamping position for clamping a tool on said tool spindle, and between a release position for releasing a tool from said tool spindle;
wherein said tool spindle is supported within said spindle head at least by means of said first and second bearings;
wherein said clamping mechanism further comprises an actuating mechanism having an actuating element being configured as a slide;
wherein said slide further comprises an engaging surface being disposed between said first and second bearings;
wherein said engaging surface of said slide is configured for engaging said positioning element for moving said positioning element axially between said clamping and said release positions;
wherein said engaging surface of said slide comprises an engaging region configured for engaging said positioning element, said engaging region having an axial extent being delimited by said first and second bearings; and
wherein said tool spindle further comprises an eccentric fork, which is disposed between said first and second bearings, and wherein said axial extent of said engaging region is delimited by said eccentric fork and said second bearing.

13. A hand-held power tool, comprising:
a housing having a spindle head;
a tool spindle having a longitudinal axis and being be driven rotatingly oscillatingly about its longitudinal axis, said tool spindle further having a drive-side and a tool-side;
a first bearing arranged within said spindle head on said drive-side of said tool spindle;
a second bearing arranged within said spindle head on said tool-side of said tool spindle; and
a clamping mechanism comprising a positioning element arranged within said tool spindle axially displaceably between a clamping position for clamping a tool on said tool spindle, and between a release position for releasing a tool from said tool spindle;
wherein said tool spindle is supported within said spindle head at least by means of said first and second bearings;
wherein said clamping mechanism further comprises an actuating mechanism having an actuating element being configured as a slide;
wherein said slide further comprises an engaging surface being disposed between said first and second bearings;
wherein said engaging surface of said slide is configured for engaging said positioning element for moving said positioning element axially between said clamping and said release positions; and
wherein said actuating element is disposed on an underside of said housing facing away from said spindle head.

14. The power tool of claim 13, wherein said actuating element is carried in a sinkable manner on said spindle head.

15. A hand-held power tool, comprising:
a housing having a spindle head;
a tool spindle having a longitudinal axis and being be driven rotatingly oscillatingly about its longitudinal axis, said tool spindle further having a drive-side and a tool-side;
a first bearing arranged within said spindle head on said drive-side of said tool spindle;
a second bearing arranged within said spindle head on said tool-side of said tool spindle; and
a clamping mechanism comprising a positioning element arranged within said tool spindle axially displaceably between a clamping position for clamping a tool on said tool spindle, and between a release position for releasing a tool from said tool spindle;
wherein said tool spindle is supported within said spindle head at least by means of said first and second bearings;

wherein said clamping mechanism further comprises an actuating mechanism having an actuating element being configured as a slide;
wherein said slide further comprises an engaging surface being disposed between said first and second bearings;
wherein said engaging surface of said slide is configured for engaging said positioning element for moving said positioning element axially between said clamping and said release positions; and
wherein said positioning element further comprises at least one guide roller for engaging said engaging surface of said actuating element.

16. A hand-held power tool, comprising:
a housing having a spindle head;
a tool spindle having a longitudinal axis and being be driven rotatingly oscillatingly about its longitudinal axis, said tool spindle further having a drive-side and a tool-side;
a first bearing arranged within said spindle head on said drive-side of said tool spindle;
a second bearing arranged within said spindle head on said tool-side of said tool spindle; and
a clamping mechanism comprising a positioning element arranged within said tool spindle axially displaceably between a clamping position for clamping a tool on said tool spindle, and between a release position for releasing a tool from said tool spindle;
wherein said tool spindle is supported within said spindle head at least by means of said first and second bearings;
wherein said clamping mechanism further comprises an actuating mechanism having an actuating element being configured as a slide;
wherein said slide further comprises an engaging surface being disposed between said first and second bearings;
wherein said engaging surface of said slide is configured for engaging said positioning element for moving said positioning element axially between said clamping and said release positions;
wherein said actuating element further comprises at least one contact arm that partially surrounds an outer circumference of said tool spindle, spaced apart from said tool spindle; and
wherein said actuating element is configured as a fork having two legs, each leg being configured as a contact arm.

17. A hand-held power tool, comprising:
a housing having a spindle head;
a tool spindle having a longitudinal axis and being be driven rotatingly oscillatingly about its longitudinal axis, said tool spindle further having a drive-side and a tool-side;
a first bearing arranged within said spindle head on said drive-side of said tool spindle;
a second bearing arranged within said spindle head on said tool-side of said tool spindle; and
a clamping mechanism comprising a positioning element arranged within said tool spindle axially displaceably between a clamping position for clamping a tool on said tool spindle, and between a release position for releasing a tool from said tool spindle;
wherein said tool spindle is supported within said spindle head at least by means of said first and second bearings;
wherein said clamping mechanism further comprises an actuating mechanism having an actuating element being configured as a slide;
wherein said slide further comprises an engaging surface being disposed between said first and second bearings;
wherein said engaging surface of said slide is configured for engaging said positioning element for moving said positioning element axially between said clamping and said release positions; and
wherein said actuating element, when being in said clamping position, is spaced apart from said positioning element.

* * * * *